A. W. BLAUL & L. HARMISON.
LARD CUTTER.
APPLICATION FILED MAR. 25, 1913.
1,065,108.
Patented June 17, 1913.
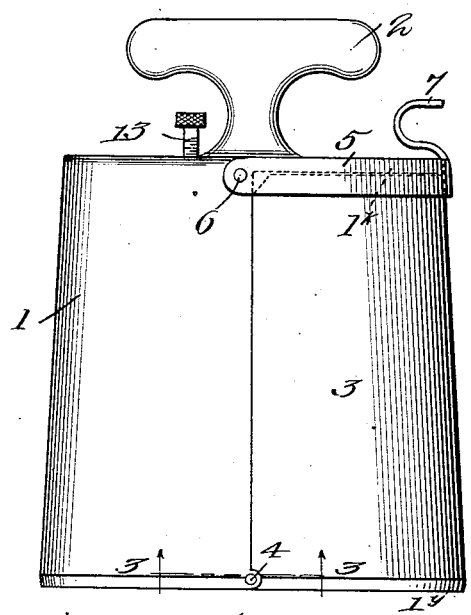
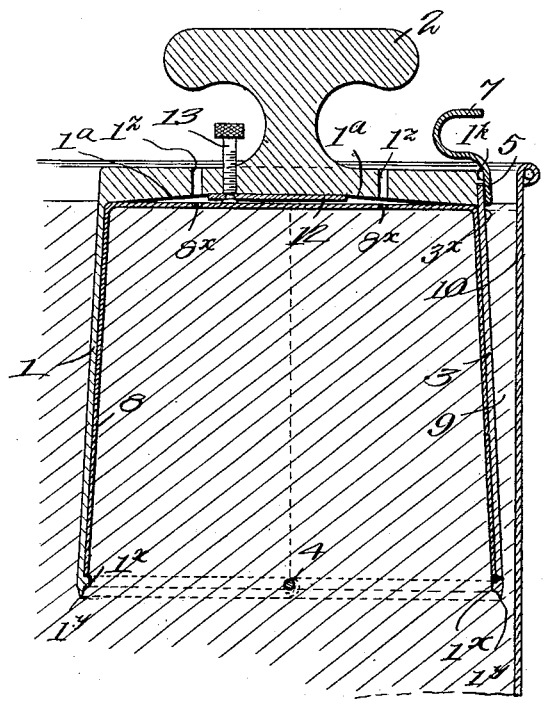
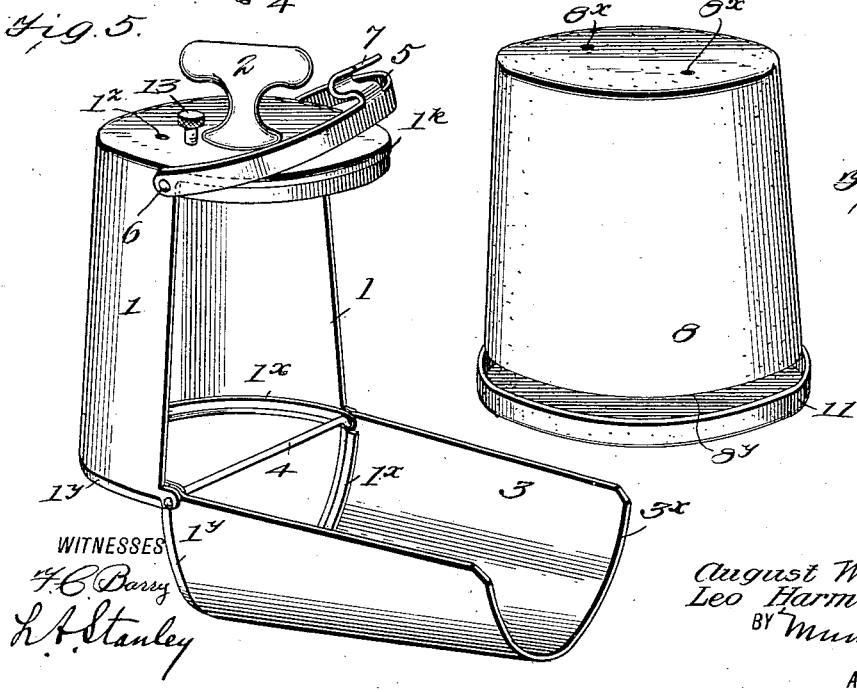
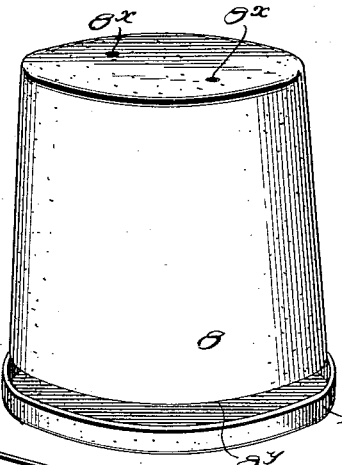
WITNESSES
F. C. Barry
L. A. Stanley
INVENTORS
August W. Blaul
Leo Harmison
BY Munn & Co.
ATTORNEYS

UNITED STATES PATENT OFFICE.

AUGUST W. BLAUL AND LEO HARMISON, OF CUMBERLAND, MARYLAND.

LARD-CUTTER.

1,065,108.　　　　　Specification of Letters Patent.　　Patented June 17, 1913.

Application filed March 25, 1913. Serial No. 756,755.

*To all whom it may concern:*

Be it known that we, AUGUST W. BLAUL and LEO HARMISON, citizens of the United States, and residents of Cumberland, in the county of Allegany and State of Maryland, have made certain new and useful Improvements in Lard-Cutters, of which the following is a specification.

Our invention relates to improvements in devices for cutting lard, and it consists in the combinations, constructions, and arrangements herein described and claimed.

An object of our invention is to provide a device by means of which lard or other similar substance such as butter, etc., may be cut from a container which holds the same in bulk and at the same time may be forced into a dispensing receptacle which may be subsequently taken from the cutting device.

A further object of our invention is to provide a device of the type described which will cut and fill a dispensing receptacle with a predetermined amount of material such as lard or butter, thereby expediting the transaction and in some cases obviating the necessity of weighing the article.

A further object of our invention is to provide a cutting device of the type described which will fill the receptacle without any danger of smearing the lard on the outside thereof.

Other objects and advantages will appear in the following specification and the novel features of the invention will be particularly pointed out in the appended claims.

Our invention is illustrated in the accompanying drawings forming part of this application in which—

Figure 1 is a side view of the device, Fig. 2 is a section through the device and a portion of the lard container, Fig. 3 is a section along the line 3—3 of Fig. 1, Fig. 4 is a perspective view of the dispensing receptacle, and Fig. 5 is a perspective view showing the cutter frame with its hinged portion open to receive the dispensing receptacle.

In carrying out our invention we provide a main cutter frame which consists preferably of a body portion 1 of tapered form, as shown in the drawings. This body portion may be made of aluminum or other suitable material and is provided near its open end with an inwardly projecting flange $1^x$ and the edge of the body portion 1 is sharpened as shown at $1^y$ in order to easily enter the lard. The closed end is provided with air vents $1^z$ and the inner surface of the closed portion is slightly concave, as shown at $1^a$. The closed end is provided with an integral handle 2.

Secured to the main body portion 1 is a hinged portion 3. The pintle 4 upon which the portion 3 is hinged is extended across the device as shown in Fig. 3 and forms a cutting wire. The outer end $3^x$ of the hinged portion is arranged to swing up against the end portion of the main casing 1, said end portion having a flange $1^k$ beneath which the end $3^x$ extends in its closed position, as shown in Fig. 5. A semicircular locking member 5 is hinged at 6 to the body portion 1 and is arranged to extend down over the end $3^x$ of the hinged portion 3. The locking member is provided with a finger hold 7 for raising and lowering it. Arranged to coöperate with the cutting frame or casing is a dispensing receptacle 8 like that shown in Fig. 4. This is tapered as shown, to conform to the interior of the casing 1 and is provided with the vents $8^x$ at its closed end.

From the foregoing description of the various parts of the device the operation thereof may be readily understood.

The dispensing receptacles 8 may be made of any suitable material but are preferably made of some light material such as pasteboard, roughened on the interior. They are designed to be of such a size as will hold a given quantity, say a pound, of lard or similar material. The device is opened in the manner shown in Fig. 5 and the receptacle 8 is placed in the casing, the edge $8^y$ of the receptacle resting upon the flange $1^x$. The hinged portion 3 is now closed upon the body portion and secured by means of the fastening device 5, as already explained. The cutter is grasped by the handle 2 and forced downwardly into the lard 9 in the container 10 (see Fig. 2). The lard enters the interior of the receptacle 8 and fills it. Now by rotating the device 180° or more the cutter 4 will cut from the lard an amount which will just fill the dispensing receptacle. The cutter is now removed from the lard and as it is removed that portion of the lard which has filled the receptacle will be taken with it. The receptacle may now be removed and either covered with paper and sold thus, or a cover such as that shown at 11 in Fig. 4 may be placed over the end of the dispensing receptacle.

In order to provide for the escape of air while the lard is entering the interior of the receptacle we provide the openings 8ˣ. The air passes into the space made by the concave surface 1ᵃ, of the end of the casing 1 and thence out through the openings 1ᶻ.

In order to provide for variations in the size of the dispensing receptacles we make use of a plate or follower 12 which has a swivel connection with a screw 13. If the dispensing receptacle should be a little too short to fit snugly within the casing the screw 13 may be manipulated so as to bring the follower 12 into such a position as to provide a firm backing for the dispensing can and to hold it securely against the flange 1ˣ.

The device described above forms a convenient means of cutting a definite quantity of lard and of filling the dispensing receptacle. In view of the fact that the exterior of the receptacle is protected there is no danger of smearing the outer portion with the lard, so that the customer has a clean, sanitary receptacle in which to convey the lard.

We claim:

1. In a cutting device for plastic material, a casing having an open end, an inwardly extending flange arranged to support an open ended receptacle, a cutter carried by the casing at its open end, and means for locking the receptacle in the casing.

2. In a cutting device for plastic material, a casing having an open end and an inwardly extending flange for supporting one end of an open receptacle, a cutter carried by the casing at its open end, means for locking the receptacle in the casing, an adjustable follower carried by the casing for holding the receptacle against the flange.

3. In a cutting device for plastic material, a casing having a body portion and a hinged portion arranged to permit the entrance of a receptacle, a flange carried by said body portion and said hinged portion near the open end of the casing for supporting the receptacle, means for locking the hinged portion to the body portion, and means carried by the casing for forcing the receptacle into close engagement with said supporting flange.

4. In a cutting device for plastic material, a casing having a body portion and a hinged portion arranged to permit the entrance of a receptacle, a flange carried by said body portion and said hinged portion near the open end of the casing for supporting the receptacle, a semicircular locking member pivotally secured to said body portion, and arranged to engage said hinged portion for locking the receptacle within the casing, and means carried by the casing for forcing the receptacle into close engagement with said supporting flange.

5. In a cutting device for plastic material, a casing having a body portion, a cutting rod or wire carried by said body portion at one end thereof, a movable portion of the casing hinged upon said cutting rod or wire and adapted to move to permit the entrance of a receptacle, a flange carried by said body portion and said hinged portion near the open end of the casing for supporting said receptacle, a semicircular locking member pivotally carried by said body portion and arranged to engage the free end of said movable portion for locking the latter in position, and means carried by the casing for forcing the receptacle into close engagement with said supporting flange.

AUGUST W. BLAUL.
LEO HARMISON.

Witnesses:
CLARK D. RINKER,
HOWARD E. CHANEY.

---

Copies of this patent may be obtained for five cents each, by addressing the "Commissioner of Patents, Washington, D. C."